May 18, 1926. 1,585,436
C. G. SWENSON
TIRE CARRIER
Filed March 31, 1924
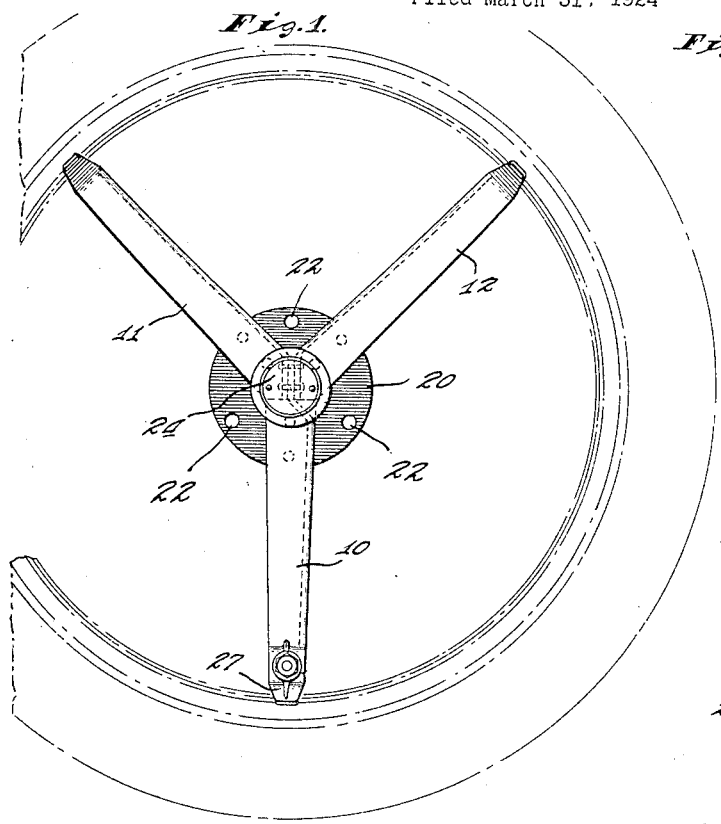
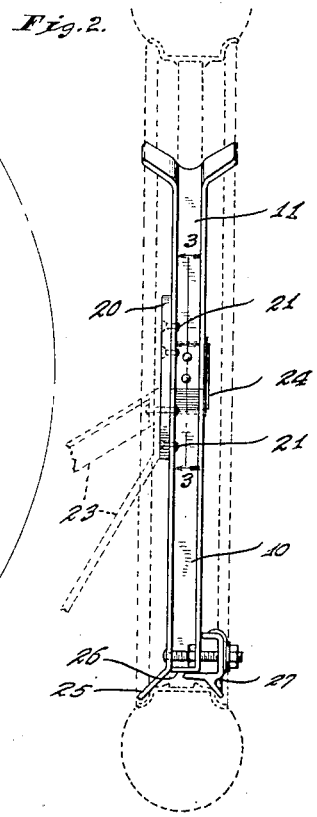
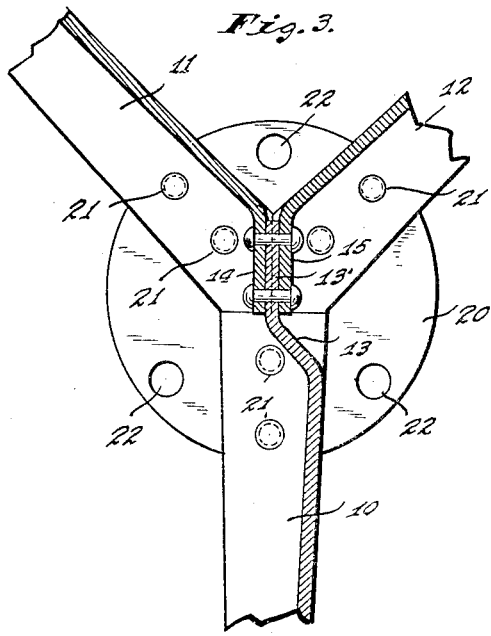
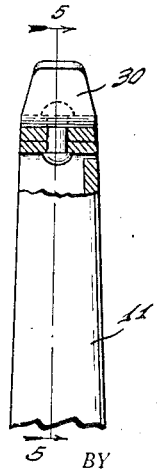
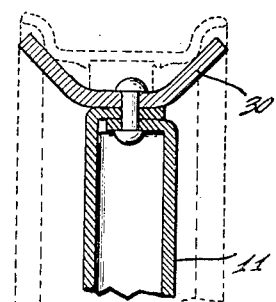
INVENTOR.
CARL G. SWENSON,
BY
ATTORNEY.

Patented May 18, 1926.

1,585,436

UNITED STATES PATENT OFFICE.

CARL G. SWENSON, OF BRUCE, WISCONSIN, ASSIGNOR TO THE OAKES COMPANY, OF INDIANAPOLIS, INDIANA, A CORPORATION OF INDIANA.

TIRE CARRIER.

Application filed March 31, 1924. Serial No. 703,131.

It is the object of my invention to produce a tire carrier for carrying the spare tire or tires of an automobile, which tire carrier, by reason of its novel construction, will be particularly rigid and will be economical to manufacture.

I accomplish the above objects by making my tire carrier in the form of a spider having arms of channel section and separating the web of the channel from the channel flanges at the inner end of each arm, bending the inner ends of the channel webs so that such inner ends are superposed, trimming the inner ends of the channel flanges so that they mate or abut respectively, and riveting or otherwise fastening together the superposed inner ends of the channel webs; and I remove the channel web for a short distance back from the outer end of each arm and bend the projecting flange-ends to form a support for the spare tire.

The accompanying drawing illustrates my invention: Fig. 1 is a rear elevation of my tire carrier in the position in which it is applied to the automobile, showing the tire and its rim in chain lines; Fig. 2 is a side elevation of my tire carrier showing in dotted lines the tire and rim and the braces for supporting the tire carrier from the automobile frame; Fig. 3 is an enlarged cross section on the line 3—3 of Fig. 2 showing the method of mounting the spider arms; Fig. 4 shows a modified form of arm-end; and Fig. 5 is a section on the line 5—5 of Fig. 4.

As shown, my tire carrier is a spider having three arms 10, 11, and 12, each of channel section with the channels so disposed that each channel web lies in a plane substantially perpendicular to the plane of the spider. At the junction of the web with each flange the inner end of each arm is split longitudinally of the arm for a distance back from the inner end of the arm. These splits extend back farther in one arm, the arm 10 as shown, than they do in the other two arms; and the freed inner end of the channel web 13 is then offset into the space between the flanges of the channel 10 so that a portion 13' of the web-end 13 lies approximately parallel to the plane of major part of the channel web. I prefer to offset this portion 13' a distance equal to approximately one half the width of the channel-flanges. The inner ends of the channel-flanges of the arm 10 are then removed for a distance, so that the portion 13' of the channel web projects beyond the inner ends of the channel flanges.

The inner ends of the channel flanges of the arms 11 and 12 are trimmed so that they abut against each other and against the inner ends of the channel flanges of the arm 10, and the inner web-ends 14 and 15 of the arms 11 and 12 respectively are bent into the space between their associated channel flanges so that the web-end 14 lies against one face of the web-end 13' and the web-end 15 lies against the opposite face of the web-end 13'. The three web-ends being thus superposed may be fastened together by rivets or by any other suitable fastening means.

I have shown the inner ends of the flanges of the arm 10 cut off perpendicular to the center line of such arm and the inner ends of the flanges of the arms 11 and 12 similarly beveled so that they abut against each other and against the inner end of the flanges of the arm 10. This particular form of the inner ends of the channel flanges is not essential, as they may be trimmed in any suitable fashion so that corresponding flanges lie in the same plane.

Beneath the junction of the three arms I place a suitable re-inforcing or supporting plate 20, and I securely fasten this plate to the channel flanges against which it lies by means of the rivets 21 shown or any other suitable fastening means. The plate 20 may be provided with holes 22 to aid in its attachment to the braces 23 which support the tire carrier from the automobile main frame (not shown). For the sake of appearance, I prefer to cover the junction of the spider arms with a small plate 24, preferably circular in form.

At the outer ends of each of the arms 10, 11, and 12, the channel web is removed for a distance back from such outer end. In two of the arms, the arms 11 and 12 as shown, the projecting ends of the channel flanges are spread apart to form a support for the tire rim which is being carried. One of the flange ends 25 of the arm 10 is bent outwardly similar to the outer ends of the flanges of the arms 11 and 12, but the other flange-end 26 of the arm 10 is bent across the end of the channel as shown in Fig. 3 to form a support for the rim-retaining clamp 27.

In the modification of my invention shown in Figs. 4 and 5, the outer ends of the channel-flanges instead of being flared outwardly are bent inwardly across the end of the channel with one flange end overlying the other to form a bridge across the channel flanges, and to this bridge is secured a rim support 30 which may conveniently be a sheet metal stamping.

For the purpose of ease and clarity of description, I have described my tire carrier in the specification and claims as though the radiating arms were formed of stock of channel section. My tire carrier could, with equal if not greater facility, be made of flat stock cut to the proper shape and then formed into channel section.

A tire carrier of the form described is exceedingly rigid, comprises but a few parts, and is very economical to manufacture.

I claim as my invention:—

1. A tire carrier, comprising a plurality of radiating arms of channel section, the channel-web of each arm being separated from its adjacent channel-flanges for a distance back from the inner end of such arm, and said separated inner web-ends being in superposed relation and fastened together, each of said arms being arranged at its outer end to engage a tire-rim.

2. A tire carrier, comprising a plurality of radiating arms of channel section, the channel-web of each arm being separated from its adjacent channel-flanges for a distance back from the inner end of such arm, said separated inner web-ends being in superposed relation and fastened together, and the inner ends of the channel-flanges of each arm being trimmed so that they abut against the corresponding inner flange-ends of the other arms, each of said arms being arranged at its outer end to engage a tire-rim.

3. The tire carrier described in claim 1 with the addition of a reinforcing plate fastened to said arms, said plate being provided with one or more holes therethrough to adapt it for attachment to a support.

4. The tire carrier described in claim 2 with the addition of a reinforcing plate fastened to said arms, said plate being provided with one or more holes therethrough to adapt it for attachment to a support.

5. A tire carrier, comprising a plurality of radiating arms of channel section, said arms being rigidly fastened together at their inner ends, each channel-flange projecting outwardly beyond the outer end of its associated channel-web, and each of such projecting flange-ends being bent out of the plane of the remainder of the flange.

In witness whereof, I have hereunto set my hand at Bruce, Rusk County, Wis., this 25th day of March, A. D. one thousand nine hundred and twenty four.

CARL G. SWENSON.